United States Patent [19]

Smith et al.

[11] Patent Number: 5,071,187

[45] Date of Patent: Dec. 10, 1991

[54] OVERHEAD GUARD FOR LIFT TRUCKS

[75] Inventors: David B. Smith, Worthington; Rainer Teufel, Columbus, both of Ohio

[73] Assignee: Crown Equipment Corporation, New Bremen, Ohio

[21] Appl. No.: 619,779

[22] Filed: Nov. 29, 1990

[51] Int. Cl.[5] .............................................. B62D 25/06

[52] U.S. Cl. ..................................... 296/102; 280/756

[58] Field of Search ....................... 296/102, 190, 200; 280/756

[56] References Cited

U.S. PATENT DOCUMENTS

| | | | |
|---|---|---|---|
| D. 271,151 | 10/1983 | Kirby et al. | D12/5 |
| 2,911,232 | 11/1959 | Hastings, Jr. et al. | 296/102 |
| 3,520,571 | 7/1970 | Rogers | 296/102 |
| 4,060,261 | 11/1977 | Bauer et al. | 296/102 |
| 4,120,375 | 10/1978 | Shinoda et al. | 280/756 |
| 4,266,808 | 5/1981 | Fassett | 280/756 |
| 4,411,464 | 10/1983 | Bauer | 296/102 |

*Primary Examiner*—Robert R. Song
*Attorney, Agent, or Firm*—Biebel & French

[57] ABSTRACT

An overhead guard assembly for use on an materials handling vehicle provides the operator with protection against falling objects. The assembly includes first and second frame members supported by the vehicle and positioned on either side of the operator, and a plate member placed between and secured to the frame members over the head of the operator. A plurality of openings are formed in the plate member to provide the operator a clear view upwardly through said overhead guard. The openings in said overhead guard are arranged in rows and a plurality of strengthening ribs are placed in the plate member between the rows and extend from one frame member to the other. The strengthening ribs are formed by reverse bending the plate member to provide a rib surface orientated at an angle of approximately 50° with respect to the horizontal to provide minimum visual obstruction to the operator.

7 Claims, 4 Drawing Sheets

OVERHEAD GUARD FOR LIFT TRUCKS

BACKGROUND OF THE INVENTION

This invention relates to an improved overhead guard for materials handling vehicles.

Overhead guards have been provided for fork lift trucks and other materials handling vehicles to protect the operator from injury due to falling objects. Many of these overhead guards are provide with openings through which the operator may look to view the load on the forks as the forks are raised to a level above the head of the operator.

One overhead guard of the prior art uses parallel spaced rectangular cross section members (similar to an egg carton construction) without a frame. While this construction provides strength to protect the operator, it restricts viewing through the guard as the angle departs from vertical. In another prior art overhead guard, cutouts are formed in a flat plate, but there is a substantial amount of uncut material in order to retain strength, but this construction also restricts the view through the guard at low angles.

SUMMARY OF THE INVENTION

The present invention relates to an overhead guard for materials handling vehicles having a plurality of openings formed in the guard to provide the operator with a clear view both forwardly and upwardly thereof.

Specifically, the overhead guard assembly includes first and second frame members supported by the vehicle and positioned on either side of the operator, and a relatively thin but strong plate member placed between and secured to the frame members over the head of the operator. A plurality of openings are formed in the plate member to provide the operator a clear view forwardly and upwardly through said overhead guard. The openings in said overhead guard are arranged in rows and a plurality of strengthening ribs are placed in the plate member between the rows and extend from one frame member to the other.

The strengthening ribs are formed by reverse bending the plate member to provide a rib surface orientated at an angle of approximately 50° with respect to the horizontal to provide minimum visual obstruction to the operator.

Thus, in those areas where a strengthening rib is formed, the rib itself is oriented at an angle to provide the minimum obstruction to viewing by the operator.

It is therefore an object of this invention to provide an overhead guard for a materials handling vehicle which is easy to construct and which provides the least obstruction to the operator's vision.

It is another object of this invention to provide a method of forming an overhead guard for use on a materials handling vehicle, said method including the steps of providing a substantially horizontally positioned guard member, forming a plurality of openings in said member, said openings being arranged in a plurality of parallel rows, and strengthening said member by bending each of said parallel rows by approximately 9.5° with respect to the plane of said member, and by reverse bending said member by approximately 60° between said rows to form transversely extending ridges, each of said ridges thereby forming a strengthening rib that has minimum visual obstruction to an operator sitting beneath said guard.

It is a further object of this invention to provide an overhead guard assembly for use on an materials handling vehicle to provide for operator protection against falling objects and the like, said guard assembly including first and second frame members positioned on either side of the operator, a plate member placed between and secured to said frame members over the head of the operator, means forming a plurality of planar rectangular panels in and extending across said plate member from one frame member to the other, said panels being integral with said plate member, means forming a plurality of openings in said panels, each of said panels being orientated at about 10° relative to the horizon to provide optimum viewing through said openings by the operator, and means forming a strengthening rib between each of said panels extending across said plate member from one frame member to the other, each said strengthening rib being integral with said plate member and orientated at an angle of approximately 60° relative to said panels to provide minimum visual obstruction to the operator.

It is a further object of this invention to provide, in a materials handling vehicle of the type that includes a power unit, an operators seat carried by the power unit, a load lifting mechanism, and an overhead guard placed over the head of the operator providing for the physical protection of the operator, an improvement wherein said overhead guard including means forming a plurality of openings therein for permitting the operator to view the operation of the load lifting mechanism through said overhead guard, said plurality of openings in said overhead guard being arranged in rows and provided with strengthening ribs between each of said rows, the shape of said ribs providing minimum visual obstruction to the operator looking upward and forward of the vehicle.

Other objects and advantages of the invention will be apparent from the following description, the accompanying drawings and the appended claims.

DESCRIPTION OF THE PREFERRED EMBODIMENT

Figure 1:
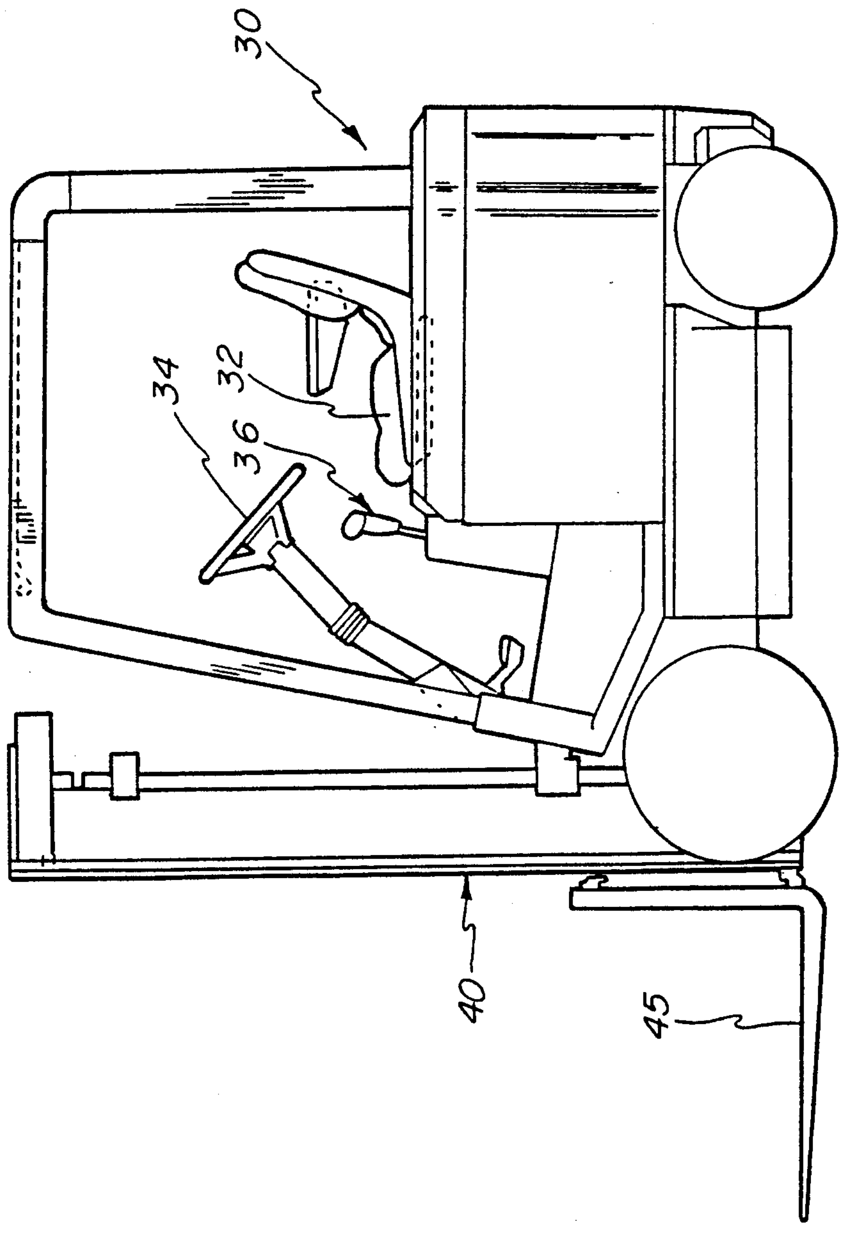
FIG. 1 is a perspective view of a fork lift truck employing an overhead guard constructed according to the present invention.
Figure 2:
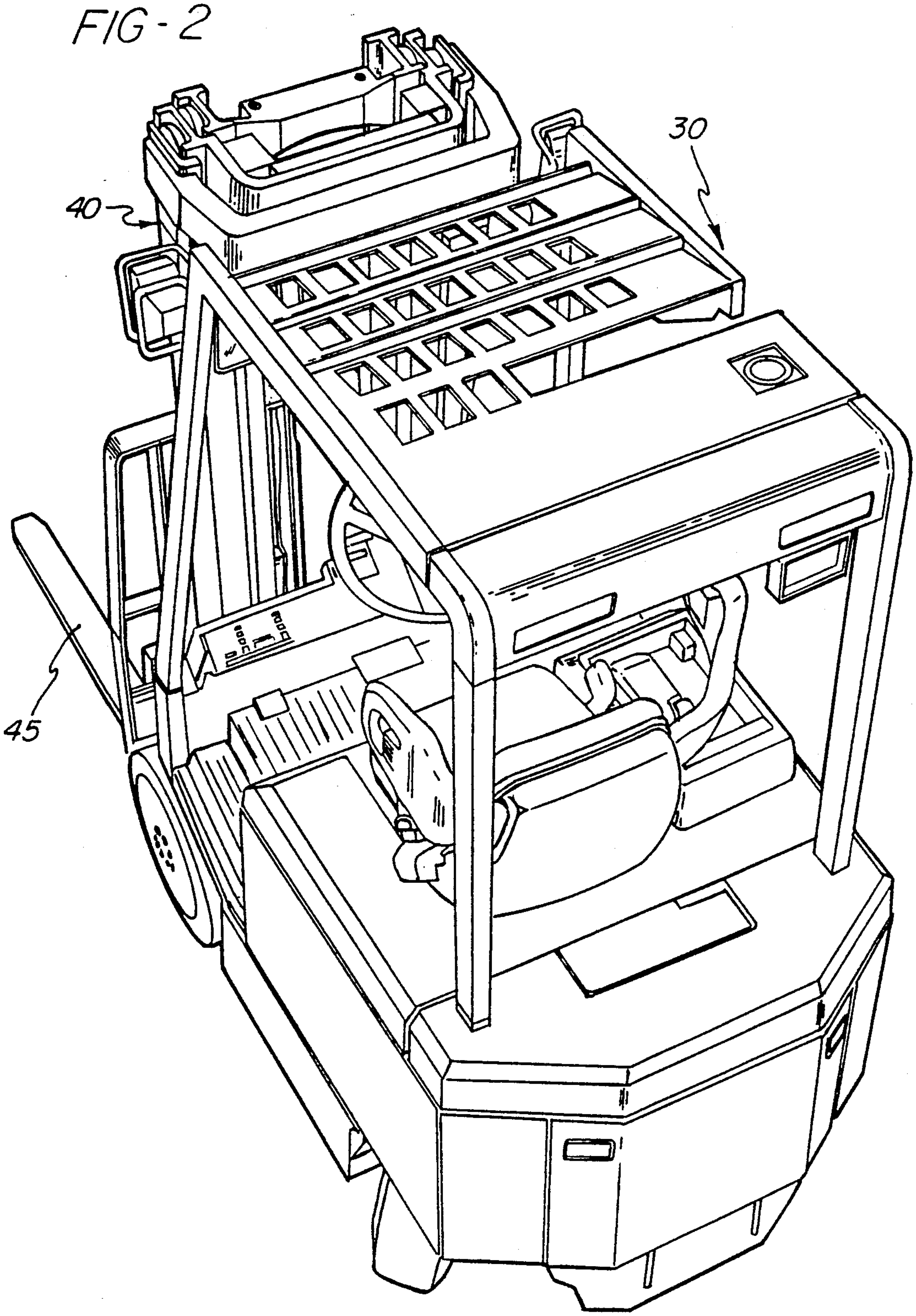
FIG. 2 is a side elevational view of the truck of FIG. 1.

Referring now to the drawings which illustrate a preferred embodiment of this invention, and particularly to FIGS. 1 and 2, a fork lift truck is shown generally at 10. The truck is provided with a power unit 20, which includes batteries for supplying power to move the vehicle and operate other functions. An operator's compartment 30 includes a seat 32, steering wheel 34 and fork lift controls 36 and foot controls 38.

A mast assembly 40 at the forward end of the truck includes a pair of forks 45 for supporting a load and a hydraulic mast 47 which allows the forks to raise the load well above the top of the truck 10. Load wheels 50 are placed at the front of the truck while steered wheels 55 are located at the rear. A traction motor (not shown) provides power to the load wheels 50.

The operator's compartment 30 is protected by an overhead guard assembly 60 that includes first and second frame members 62 and 64 positioned on either side of the operator's seat 32 and a plate member 70 placed between and secured to the frame members 62, 64 over the head of the operator. The plate member 70 is preferably secured to the frame members by welding and is formed from steel plate approximately 0.31 inches thick.

The plate member 70 includes a plurality of planar rectangular panels 72, 74 and 76 that are integral with and extend across said plate member from one edge to the other. Within each of these panels are formed a plurality of openings 80. As shown, there are three panels each with 7 rectangular openings approximately 2.37×4 inches spaced apart laterally by 0.88 inches. The lengthwise separation of the panels is approximately 1.5 inches. The number and dimensions of these openings has been selected to provide a balance between the maximizing the amount of visual openings and the strength of the guard. Also shown is a fourth panel 82 that has formed therein three rectangular openings 84 starting on the left side and one elongated opening 86 that extends to the right edge.

The elongated opening 86 is designed to permit a hoist to be attached to the batteries located in the power unit 20 below the panel 70 for removal and replacement. An opening 88 receives a lamp assembly for illumining the operator's compartment 30.

Figure 3:
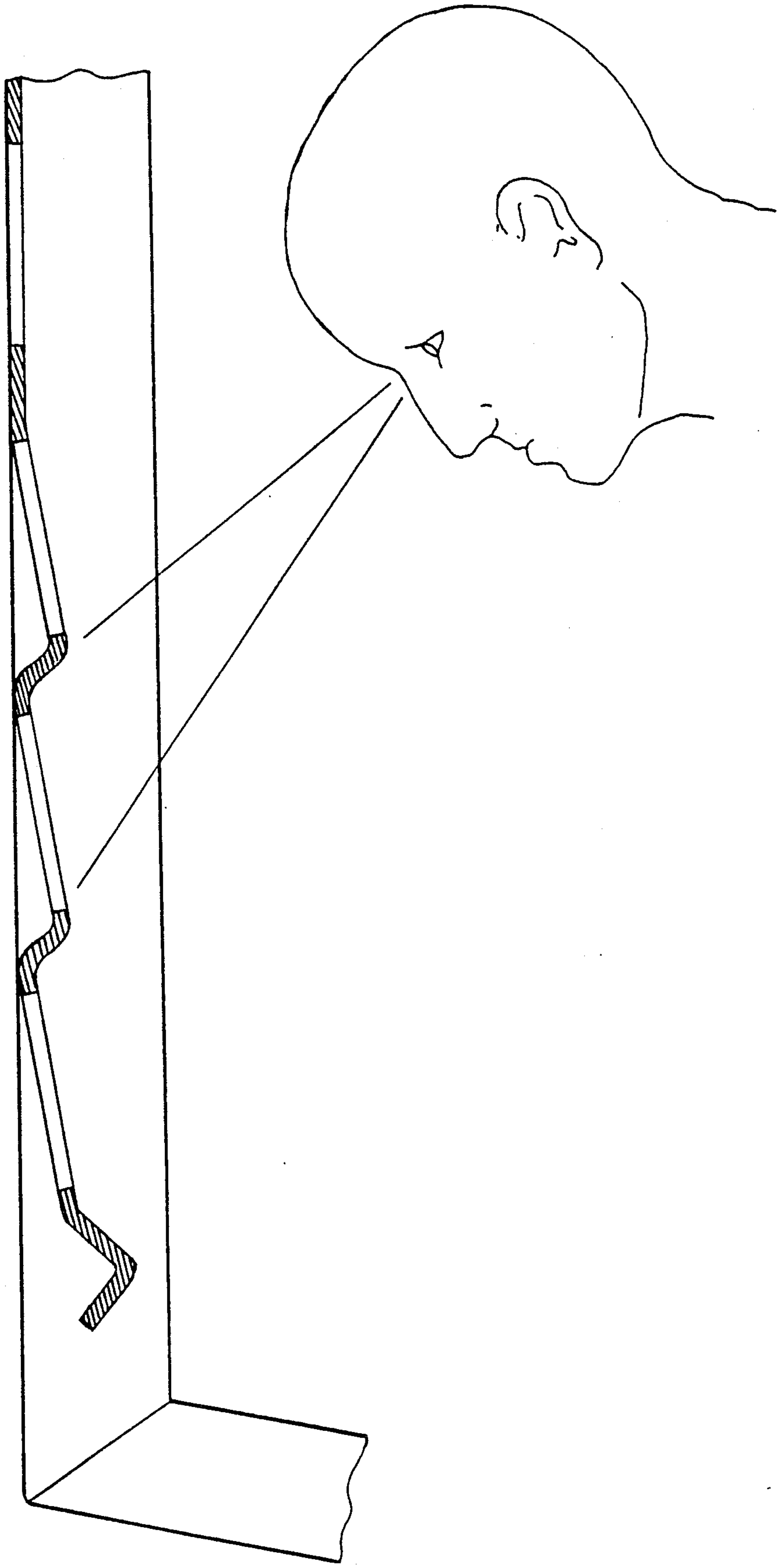
FIG. 3 is a side elevational view, partly in cross section, showing the orientation of the strengthening ribs in the overhead guard relative to an operator.
Figure 5:
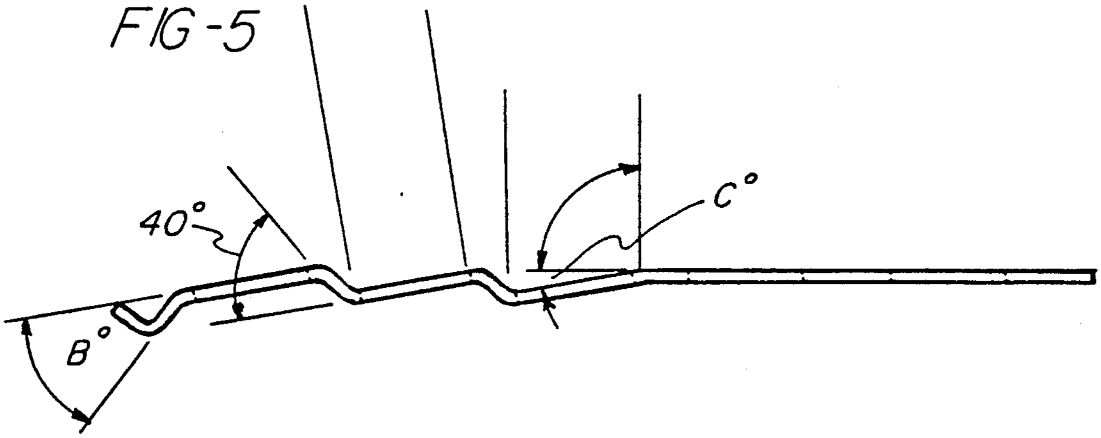
FIG. 5 is a side elevational view of the overhead guard plate.

Each of the panels 72, 74, 76 is bent downwardly, as shown in FIGS. 3 and 5, by an angle A of about 10° relative to the horizon or the plane of the remainder of the plate 70. This orientation provides optimum viewing upwardly and forwardly of the vehicle through said openings by an operator when sitting on the seat 32.

Figure 4:
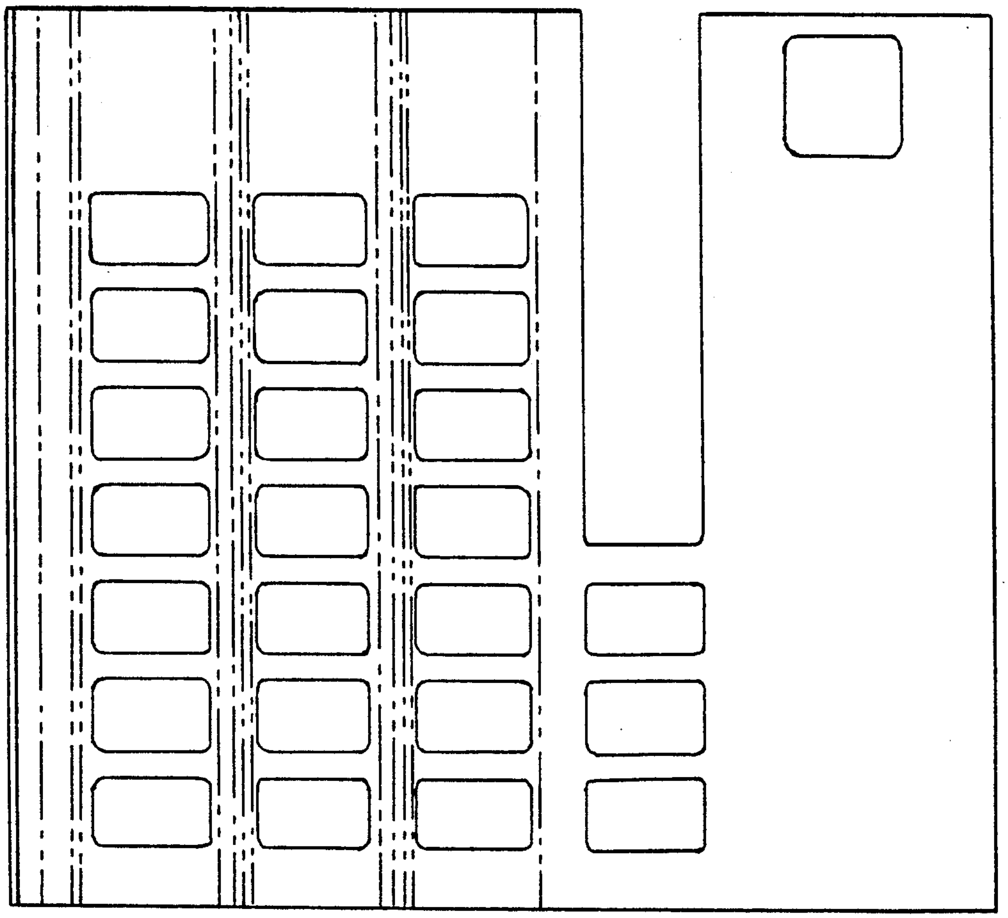
FIG. 4 is a plan view of the overhead guard plate of the present invention.

Strengthening rib 92 is formed between the panels 72, and 74 and strengthening rib 94 is formed between panels 74 and 76. As shown in FIG. 4, these ribs extend across the plate member from one edge to the other. These ribs are integral with said plate member are formed by reverse bending the plate. The major portion of each rib is orientated at an angle B of approximately 60° relative to the panels 72, 74 and 76 to provide minimum visual obstruction to the operator 90. As shown in FIG. 3, from the operator's position, the body of the ribs 92, 94 are essentially parallel to the line of sight as the operator views a raised load or views the area beyond and above the vehicle.

At the forward end of the plate 70 is a further strengthening member 96 formed in a "V" shape. The strengthening member 96 is also formed by bending the plate 70 downwardly at an angle C of about 40.5° relative to the plane of the panel 76.

By bending the plate 70 to form panels 72, 74 and 76 as described above, and by reverse bending the plate between panels at the forward end to form strengthening ribs, a overhead guard is provided which is not only strong but does not obstruct the operators upward and forward view.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. In a materials handling vehicle of the type that includes a power unit, an operators seat carried by the power unit, a load lifting mechanism, and an overhead guard placed over the head of the operator providing for the physical protection of the operator, the improvement comprising said overhead guard including means forming a plurality of openings therein for permitting the operator to view the operation of the load lifting mechanism through said overhead guard, said plurality of openings in said overhead guard being arranged in rows and provided with strengthening ribs between each of said rows, wherein said strengthening ribs extend upwardly and forwardly at an angle of approximately 50° with respect to the horizontal, the shape of said ribs providing minimum visual obstruction to the operator looking upward and forward of the vehicle.

2. An overhead guard assembly for use on an materials handling vehicle to provide for operator protection against falling objects and the like, said guard assembly including first and second frame members positioned on either side of the operator, a plate member placed between and secured to said frame members over the head of the operator, means forming a plurality of openings in said plate member for providing the operator a view upwardly through said overhead guard, said plurality of openings in said overhead guard being arranged in rows, and a plurality of strengthening ribs formed in said plate member, wherein said strengthening ribs extend upwardly and forwardly at an angle of approximately 50° with respect to the horizontal the shape of said strengthening ribs providing minimum visual obstruction to the operator.

3. The overhead guard of claim 2 wherein said strengthening ribs extend from one frame member to the other frame member.

4. The overhead guard of claim 2 wherein said strengthening ribs are formed in the solid areas between said rows of openings.

5. The overhead guard of claim 2 wherein said strengthening ribs includes a rib at the one edge of said plate member.

6. An overhead guard assembly for use on an materials handling vehicle to provide for operator protection against falling objects and the like, said guard assembly including first and second frame members positioned on either side of the operator, a plate member placed between and secured to said frame members over the head of the operator, means forming a plurality of planar rectangular panels in and extending across said plate member from one frame member to the other, said panels being integral with said plate member, means forming a plurality of openings in said panels, each of said panels being orientated at about 10° relative to the horizon to provide optimum viewing through said openings by the operator, and means forming a strengthening rib between each of said panels extending across said plate member from one frame member to the other, each said strengthening rib being integral with said plate member and extending upwardly and forwardly at an angle of approximately 50° with respect to the horizontal to provide minimum visual obstruction to the operator.

7. A method of forming an overhead guard for use on a materials handling vehicle, said method including the steps of providing a substantially horizontally positioned guard member, forming a plurality of openings in said member, said openings being arranged in a plurality of parallel rows, and strengthening said member by bending each of said parallel rows downwardly by approximately 9.5° with respect to the plane of said member, and by reverse bending said member forwardly and upwardly by approximately 60° between said rows to form transversely extending ridges, each of said ridges thereby forming a strengthening rib that has minimum visual obstruction to an operator sitting beneath said guard.

* * * * *